United States Patent [19]
Deletzke, Jr.

[11] 3,946,962
[45] Mar. 30, 1976

[54] HUB FOR A REEL OF RECORDING TAPE

[76] Inventor: Norman E. H. Deletzke, Jr., P.O. Box 221, Wilmette, Ill. 60091

[22] Filed: May 2, 1974

[21] Appl. No.: 466,382

[52] U.S. Cl. .............................................. 242/68.3
[51] Int. Cl.² .................................... B65H 17/02
[58] Field of Search ........ 242/68.3, 72; 287/DIG. 5; 197/175

[56] References Cited
UNITED STATES PATENTS

| | | | |
|---|---|---|---|
| 3,058,686 | 10/1962 | Field | 242/68.3 |
| 3,275,257 | 9/1966 | Cherniavskyj | 242/71.8 |

FOREIGN PATENTS OR APPLICATIONS

| | | | |
|---|---|---|---|
| 617,095 | 3/1961 | Canada | 242/68.3 |
| 713,997 | 11/1941 | Germany | 242/68.3 |

Primary Examiner—Edward J. McCarthy

[57] ABSTRACT

A unitary hub for receiving and securing a reel of recording tape is disclosed. The hub has a housing having a plurality of openings disposed between the base and the top of the housing. A corresponding plurality of resilient detents, disposed internally to the housing, is urged partially through the openings therein. The detents retract into the housing when a reel of recording tape is moved over the detents toward the base of the hub, and thereafter protrude through the openings to apply pinching forces against the reel for holding the reel in place.

2 Claims, 3 Drawing Figures

HUB FOR A REEL OF RECORDING TAPE

BACKGROUND OF INVENTION

This invention relates to a hub for receiving and securing a reel of recording tape, particularly a relatively large reel of the type used for commercial recording and replay purposes.

Prior art devices generally include a two-piece hub having a base portion and a removable top portion. To secure the reel to the hub, the top portion thereof must first be removed to enable the reel to be placed into cooperation with the base portion. The top portion of the hub is then positioned over the tape reel and clamped into engagement with the base portion to maintain the reel securely in place. Thereafter, in order to remove the reel, the top portion must be disengaged from the base portion and removed. Other prior art hubs utilize manually-set indexing means to mechanically retain the reel in place.

Though such prior art hubs have operated well in maintaining tape reels in place, the successive removal and re-engagement of the top portion of the hub or the manual setting of indexing means each time a reel is added or removed has sometimes proved to be a time-consuming and cumbersome task. This has been particularly true when an operator must hold large, flangeless reels with one hand while manipulating the top portion or the indexing portion of the hub with the other. Under such circumstances, tape may undesirably unravel from the reel, wasting time and sometimes ruining the tape.

The invention overcomes these and other deficiencies in the prior art by providing a unitary hub having detent means for releasably maintaining a reel of recording tape in position with minimal operator participation. More particularly, the hub of the invention includes a housing having a plurality of openings, preferably three, through which a corresponding plurality of resilient detents, such as spring-loaded balls are adapted to retractably protrude. The interior of the housing has guide means which provide a path for the spring-loaded balls upon retraction thereof.

When a reel of recording tape is positioned over the balls toward the base of the hub, the balls are urged against the force of the associated springs, causing the balls to retract through the corresponding openings in the housing and along the path provided by the guide means. After the reel has passed over the balls, the force of the springs urges them to protrude through the openings in the housing where they apply pinching forces to the reel for maintaining the reel securely in place. Thereafter, the reel can be removed simply by pulling it back over the balls and off of the hub.

Since the balls are of relatively large diameter, they offer relatively little friction with the reel, thereby minimizing the force required to position and remove the reel. Moreover, the tape hub is electrically grounded in order to dissipate any spurious charges that may develop, particularly those produced by static electricity. Finally, the hub is provided with a fluted top, adapted to permit controlled manual rotation of the reel, whereby the hub can be used as an editing knob for altering or rearranging the tape, and easily handled when positioned on or off of a turntable spindle.

OBJECTS OF THE INVENTION AND A BRIEF DESCRIPTION OF THE DRAWINGS

It is a primary object of the invention to provide an improved hub for use with a reel of recording tape.

It is another object of the invention to provide an improved unitary hub for use with a reel of recording tape.

It is a further object of this invention to provide an improved hub, having detent means which securely maintain a reel of recording tape in place, and which also permit the easy positioning and removal of the reel.

A feature of this invention provides means for grounding the tape hub in order to dissipate spurious charges such as those produced by static electricity.

Another feature of this invention provides a fluted top for the tape hub which is adapted to permit controlled manual rotation of the reel, and easily handling of the hub.

Other objects, features, and advantages of the invention will be apparent upon reading the following detailed description of an exemplary embodiment in conjunction with the accompanying drawings in which.

DETAILED DESCRIPTION OF A PREFERRED EMBODIMENT OF THE INVENTION

Figure 1:
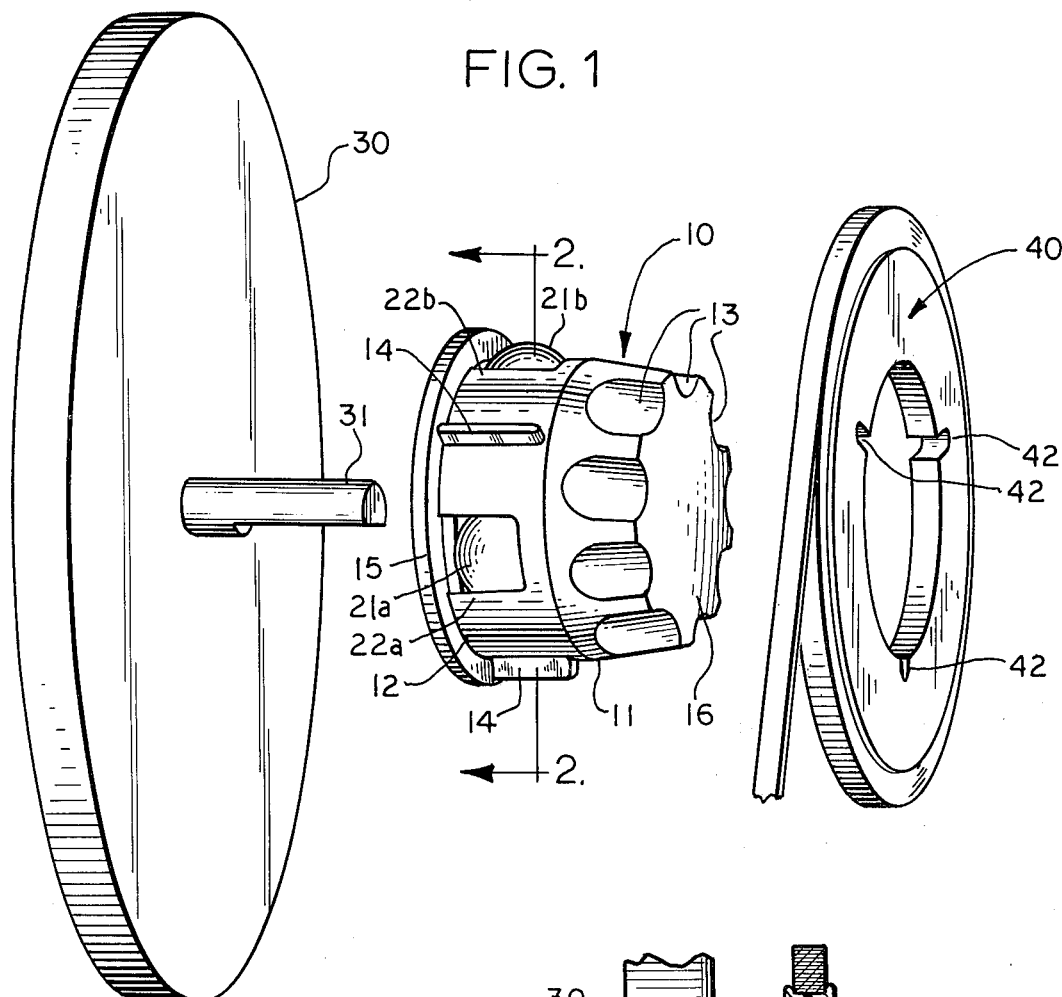
FIG. 1 is a perspective view of the tape hub of the invention showing, in exploded form, a reel of recording tape and a turntable used in conjunction with the tape hub.

Referring now to FIG. 1, a tape hube is represented generally by reference numeral 10, and a reel of recording tape, adapted to cooperate with tape hub 10, is represented generally by reference numeral 40. Tape hub 10 has a housing 11 having a base 12 and a top portion 16. Top portion 16 has a plurality of integral finger flutes 13 which are adapted to permit controlled manual rotation of tape hub 10 and reel 40 as well as easy handling of tape hub 10. A turntable 30, having a spindle 31, is adapted to rotate tape hub 10. Housing 11 of tape hub 10 may be fabricated from fiberglass or some other durable, yet inexpensive material.

Housing 11 further includes a plurality of integral flanges 14 aligned with a corresponding plurality of notches 42 in the inside perimeter of reel 40. Flanges 14 guide reel 40 onto tape hub 10, and impart angular motion to reel 40 when tape hub 10 is rotated by turntable 30. Housing 11 of tape hub 10 also preferably includes a lip 15, surrounding base 12. Lip 15, in a manner explained hereinafter, is used for supporting reel 40, though it should be emphasized that lip 15 is not necessarily needed since reel 40 can be adapted to fit flush against turntable 30 if desired.

Figure 2:
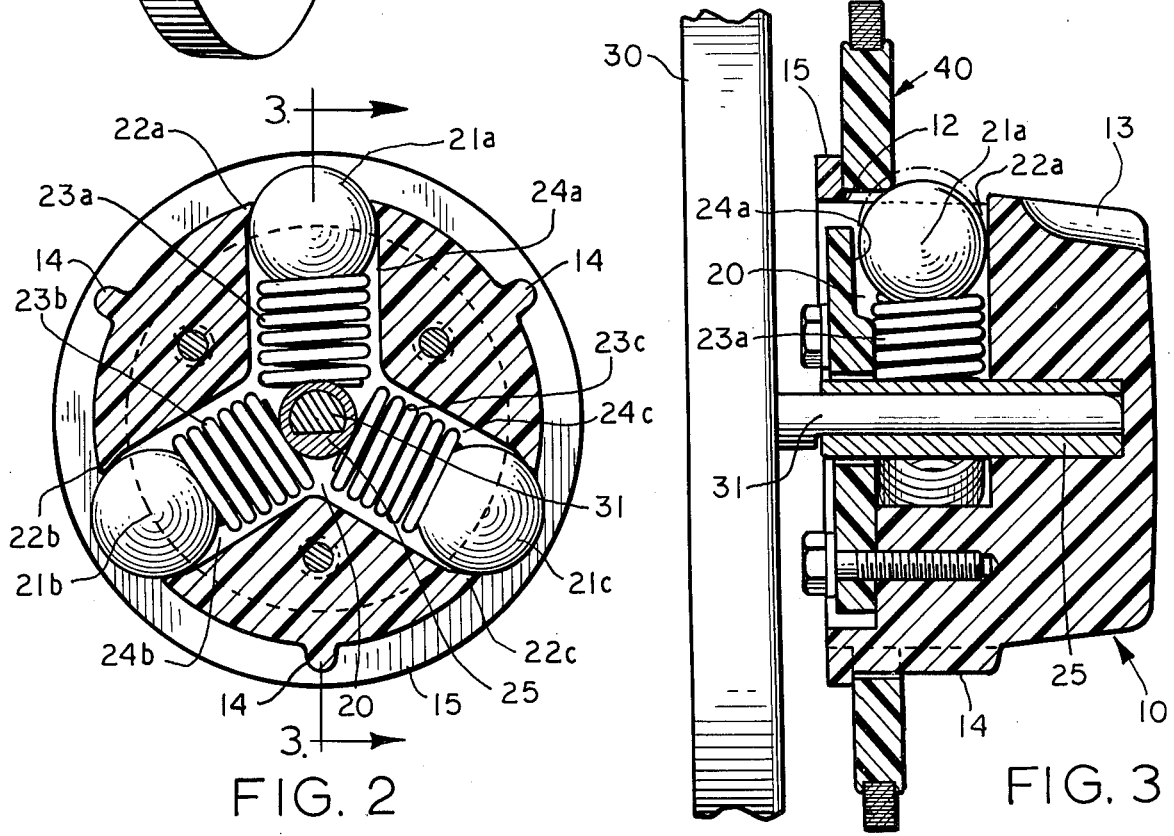
FIG. 2 is an enlarged, cross-sectional view of the tape hub taken along line 2—2 in FIG 1.

A plurality of openings 22a, 22b, and 22c, best seen in FIG. 2, are disposed between base 12 and top portion 16 of housing 11. Openings 22a, 22b, and 22c are adapted to cooperate with a corresponding number of metal balls 21a, 21b, and 21c disposed internally to housing 11. The diameter of balls 21a, 21b, and 21c is slightly larger than corresponding openings 22a, 22b, and 22c, thereby preventing the balls from passing entirely therethrough.

A hollow, cylindrical metal standard 25 extends axially within housing 11 of tape hub 10, and guide means 20 comprising channels 24a, 24b, and 24c, are also disposed internally to housing 11. Channels 24a, 24b, and 24c emanate from standard 25 and extend radically, terminating in openings 22a, 22b, and 22c, respectively.

Resilient means, such as a plurality of metal springs 23a, 23b, and 23c, are captivated, respectively, in channels 24a, 24b, and 24c, between standard 25 and balls 21a, 21b, and 21c, respectively. Springs 23a, 23b, and 23c thus urge corresponding balls 21a, 21b, and 21c partially through corresponding openings 22a, 22b, and 22c in housing 11. Because the diameter of the balls is greater than the size of the openings, however, the balls are prevented from passing entirely therethrough.

Figure 3:
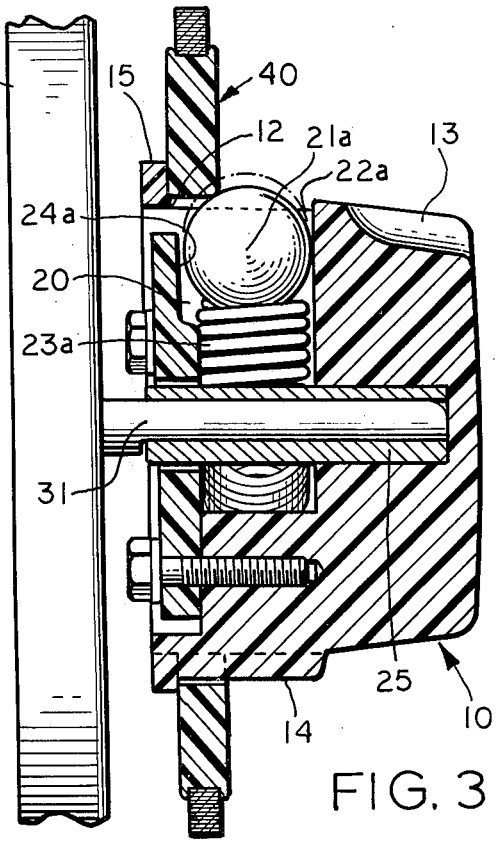
FIG. 3 is an enlarged, cross-sectional view of the tape hub taken along lines 3—3 in FIG. 2.

When external pressure is exerted on balls 21a, 21b, and 21c, such as when a reel of recording tape is positioned over hub 10 and pushed toward base 12, balls 21a, 21b, and 21c retract through corresponding openings 22a, 22b, and 22c along paths defined by channels 22a, 22b, and 22c, respectively. After reel 40 has passed over balls 21a, 21b, and 21c, and is seated flush with lip 15, balls 21a, 21b, and 21c are again urged partially through corresponding openings 22a, 22b, and 22c by springs 23a, 23b, and 23c, respectively. When so seated, as shown in FIG. 3, reel 40 is maintained securely in place by the pinching forces developed by the balls and lip 15. Of course, if housing 11 is fabricated without lip 15, reel 40 could still be maintained in place by the pinching forces developed by the balls and turntable 30.

To remove reel 40 from tape hub 10, reel 40 need only be pushed against balls 21a, 21b, and 21c, causing them to retract into openings 22a, 22b, and 22c, respectively. Reel 40 can then be lifted completely off of hub 10 without interference from balls 21a, 21b, and 21c. Because of the relatively large diameter of balls 21a, 21b, and 21c, there is minimal friction with reel 40, thereby permitting reel 40 to be easily removed from tape hub 10 when desired.

As shown best in FIG. 3, spindle 31 of turntable 30 cooperates with hollow, cylindrical metal standard 25 to impart rotational motion from turntable 30 to tape hub 10. Further, metal ball 21a, metal spring 23a, and metal standard 25 form an electrical path to spindle 31, thereby grounding any spurious electrical charges that may be associated with tape hub 10.

In view of the foregoing, it should be clear that the tape hub of the invention securely maintains in proper position a reel of recording tape, and permits the easy positioning and removal thereof. It should also be clear that other embodiments of this invention can be devised without departing from the true spirit of the invention. Accordingly, the invention should not be limited to the exemplary embodiment described in detail herein, but should be entitled to the full scope defined in the appended claims.

I claim:

1. A hub, for releasably seating a reel in facing relationship with a turntable having an upwardly extending spindle, comprising:

a housing, including a base portion, a top portion, and an electrically conductive axial standard extending upwardly from said base portion to said top portion for receiving said spindle; said housing defining three internal channels extending radially from said axial standard, each of said channels terminating in an opening defined in the periphery of said housing;

three electrically conductive balls movably disposed in respective ones of said channels; each of said balls being of such diameter as to only partially protrude through a respective opening in the periphery of said housing; and three electrically conductive spring members disposed, respectively, in said channels in contacting relationship between said axial standard and one of said balls, thereby establishing an electrical path from each of said balls, through a respective spring member, to said axial standard for dissipating spurious electrical charges via said spindle; said balls being adapted to retract into said openings against said springs when said reel is moved over said hub and past said openings, and said balls being further adapted to be urged by said springs partially through said openings and against said reel to seat said reel in facing relationship with said turntable.

2. The hub defined in claim 1 wherein said top portion includes a plurality of finger flutes disposed about the periphery of said top portion for facilitating the manual rotation of said hub.

* * * * *